United States Patent
Nishide et al.

(10) Patent No.: US 11,048,465 B2
(45) Date of Patent: Jun. 29, 2021

(54) IMAGING DISPLAY DEVICE, WEARABLE DEVICE, AND IMAGING DISPLAY SYSTEM

(71) Applicant: CANON KABUSHIKI KAISHA, Tokyo (JP)

(72) Inventors: Yosuke Nishide, Kawasaki (JP); Takeshi Ichikawa, Hachioji (JP); Akira Okita, Yamato (JP); Toshiki Tsuboi, Tokyo (JP); Nao Nakatsuji, Kawasaki (JP); Hiroshi Yoshioka, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/562,304

(22) Filed: Sep. 5, 2019

(65) Prior Publication Data

US 2020/0089456 A1 Mar. 19, 2020

(30) Foreign Application Priority Data

Sep. 18, 2018 (JP) .............................. JP2018-174104
Jul. 5, 2019 (JP) .............................. JP2019-126318

(51) Int. Cl.
*G06F 3/147* (2006.01)
*H04N 5/374* (2011.01)
*G06F 3/14* (2006.01)
*H04N 5/232* (2006.01)

(52) U.S. Cl.
CPC ............ *G06F 3/147* (2013.01); *G06F 3/1423* (2013.01); *H04N 5/23235* (2013.01); *H04N 5/374* (2013.01)

(58) Field of Classification Search
None
See application file for complete search history.

(56) References Cited

U.S. PATENT DOCUMENTS

| 2005/0111551 | A1* | 5/2005 | Sato | H04N 19/61 375/240.16 |
| 2007/0195211 | A1* | 8/2007 | Fujimori | G09G 5/399 349/5 |
| 2014/0176591 | A1* | 6/2014 | Klein | G09G 5/026 345/589 |
| 2015/0314140 | A1* | 11/2015 | Verhaegen | A61N 5/1031 378/62 |
| 2018/0260120 | A1* | 9/2018 | Ozguner | G06F 3/0604 |

FOREIGN PATENT DOCUMENTS

| JP | 2002-176162 A | 6/2002 |
| JP | 2008-067268 A | 3/2008 |
| WO | 2008/018156 A1 | 2/2008 |
| WO | 2017/047178 A1 | 3/2017 |

* cited by examiner

*Primary Examiner* — Talha M Nawaz
(74) *Attorney, Agent, or Firm* — Canon U.S.A., Inc. I.P. Division

(57) ABSTRACT

An imaging unit includes a plurality of photoelectric conversion elements, a processing unit, and a display unit. The processing unit processes a signal transmitted from the imaging unit. The display unit displays an image based on the signal transmitted from the processing unit. The imaging unit acquires first image information at a first time. The processing unit generates first prediction image information at a second time later than the first time based on the first image information. Moreover, the display unit displays an image based on the first prediction image information.

19 Claims, 13 Drawing Sheets

FIG.5

| | T₋₃ | T₋₂ | T₋₁ | T₀ |
|---|---|---|---|---|
| REAL IMAGE (IN THE LIGHT) | | | | |
| REAL IMAGE (IN THE DARK) | | | | |
| IMAGE OF COMPARISON EXAMPLE | | | | |
| IMAGE OF PRESENT EXEMPLARY EMBODIMENT | | | | |

FIG.13

| | EXTERNAL INFORMATION | PARTIAL IMAGE INFORMATION |
|---|---|---|
| EXAMPLE 1 | ENLARGE | |
| EXAMPLE 2 | | |

IMAGING DISPLAY DEVICE, WEARABLE DEVICE, AND IMAGING DISPLAY SYSTEM

BACKGROUND

Field

The present disclosure relates to an imaging display device, a wearable device, and an imaging display system.

Description of the Related Art

A wearable device called a head-mounted display or a pair of smart-glasses having an imaging display device has been known. In one system of the above-described wearable device, a scenery in front of a user is captured as an image through the imaging display device, and the captured image is displayed on a display device. In the above-described system, the user can feel as if the user was directly watching the external scenery even though watching it via the display apparatus.

In order to miniaturize the above-described display apparatus, Japanese Patent Application Laid-Open No. 2002-176162 discusses a technique for arranging a photodiode and an electroluminescence (hereinafter, "EL") element on a same substrate in a matrix state.

SUMMARY

According to an aspect of the present disclosure, an imaging display device includes an imaging unit including a plurality of photoelectric conversion elements, a processing unit configured to process a signal transmitted from the imaging unit, and a display unit configured to display an image based on the signal transmitted from the processing unit, wherein the imaging unit acquires first image information at a first time, wherein the processing unit generates first prediction image information at a second time later than the first time based on the first image information, and wherein the display unit displays an image based on the first prediction image information.

Further features of the present disclosure will become apparent from the following description of exemplary embodiments with reference to the attached drawings.

BRIEF DESCRIPTION OF THE DRAWINGS

FIG. 5 is a diagram illustrating operation of the imaging display device according to the second exemplary embodiment.

FIG. 13 is a schematic diagram illustrating operation of an imaging display device according to an eleventh exemplary embodiment.

DESCRIPTION OF THE EMBODIMENTS

Hereinafter, exemplary embodiments will be described with reference to the appended drawings. In below-described exemplary embodiments, description of a configuration similar to that already described in another exemplary embodiment will be omitted. Further, the exemplary embodiments can be changed or combined as appropriate.

Figure 1A:
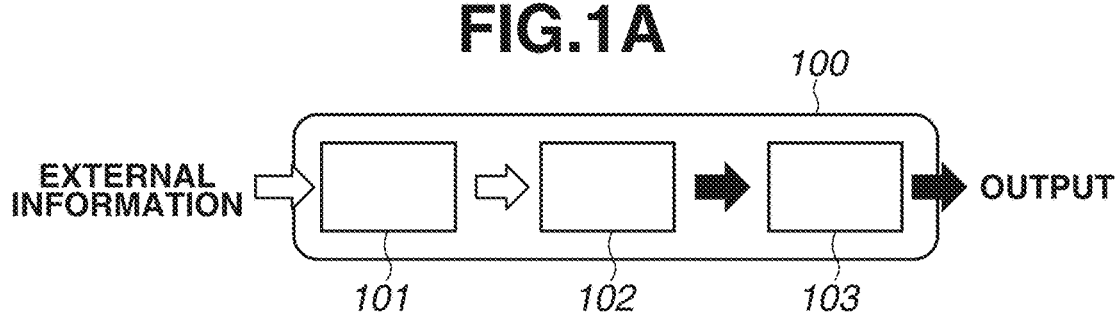
FIG. 1A is a schematic diagram illustrating an imaging display device according to a first exemplary embodiment.

A first exemplary embodiment will be described below. The present exemplary embodiment will be described with reference to FIGS. 1A to 1D and FIGS. 2A and 2B. FIG. 1A is a schematic diagram illustrating an imaging display device 100 according to the present exemplary embodiment. The imaging display device 100 includes an imaging unit 101, a processing unit 102, and a display unit 103.

The imaging unit 101 includes a plurality of light receiving elements. For example, photoelectric conversion elements are used as the light receiving elements. The light receiving elements execute imaging operation for acquiring image information by converting light entering from the outside (external information) to electric signals. Based on the image information from the imaging unit 101, the processing unit 102 generates information about an image that is to be captured by the imaging unit 101 in the future (hereinafter, referred to as "prediction image information"). The display unit 103 includes a plurality of light emitting elements. Each of the plurality of light emitting elements converts an electric signal to light. The display unit 103 displays (outputs) an image based on the prediction image information generated by the processing unit 102. A plurality of pixels is arranged on the imaging unit 101 and the display unit 103 in an array state. Each of the pixels arranged on the imaging unit 101 includes at least one light receiving element, and each of the pixels arranged on the display unit 103 includes at least one light emitting element. The processing unit 102 receives image information from the imaging unit 101 and outputs prediction image information to the display unit 103. Further, the processing unit 102 can output a control signal for executing imaging operation and a control signal for executing display operation to the imaging unit 101 and the display unit 103, respectively.

Figure 1B:
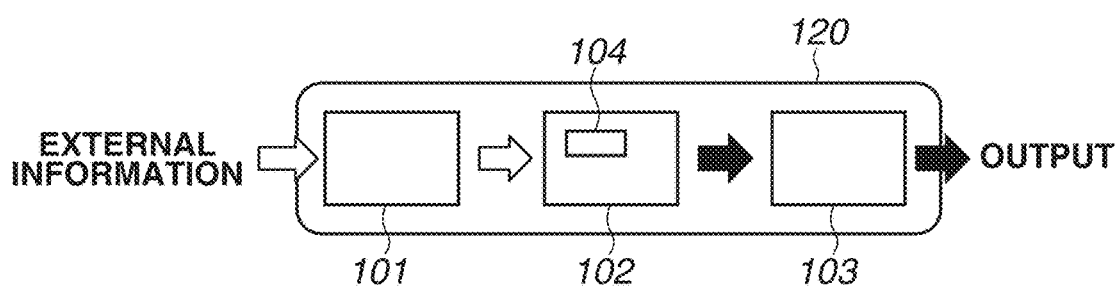
FIG. 1B is a schematic diagram illustrating a variation example of the imaging display device according to the first exemplary embodiment.

Herein, a variation example of the imaging display device 100 according to the present exemplary embodiment illustrated in FIG. 1A will be described. FIG. 1B is a schematic diagram illustrating the variation example of the imaging display device 100 according to the present exemplary embodiment in FIG. 1A. In an imaging display device 120, the processing unit 102 illustrated in FIG. 1A includes an artificial intelligence (AI) unit 104 on which AI is mounted. In the present exemplary embodiment, the AI unit 104 has a deep learning (deep structured learning) function. In FIG. 1B, image information captured by the imaging unit 101 is converted to prediction image information by the processing unit 102 including the AI unit 104.

Figure 1C:
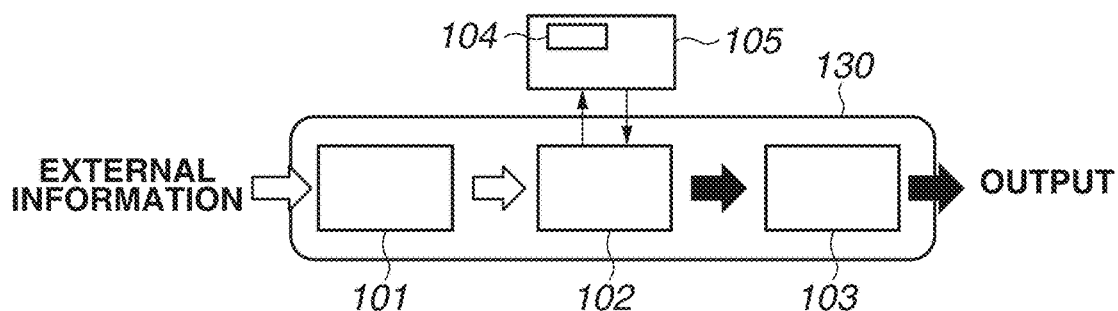
FIG. 1C is a schematic diagram illustrating another variation example of the imaging display device according to the first exemplary embodiment.

FIG. 1C is a schematic diagram illustrating a variation example of the imaging display device 100 of the present exemplary embodiment illustrated in FIG. 1A. A processing unit 102 of an imaging display device 130 communicates with a processing apparatus 105. The processing unit 102 and the processing apparatus 105 are connected to each other via a network. The processing apparatus 105 is arranged on the outside of the imaging display device 130, e.g., the cloud. In the imaging display device 130, the AI unit 104 is included not in the processing unit 102 but in the processing apparatus 105. The processing unit 102 and the processing apparatus 105 exchange information, and prediction image information is thereby generated based on image information. In FIG. 1C, the image information captured by the imaging unit 101 is converted to prediction image information by the processing unit 102 that has acquired the information from the processing apparatus 105. In such a manner, the imaging display device 130 can generate prediction image information using the information stored in the external apparatus.

Figure 1D:
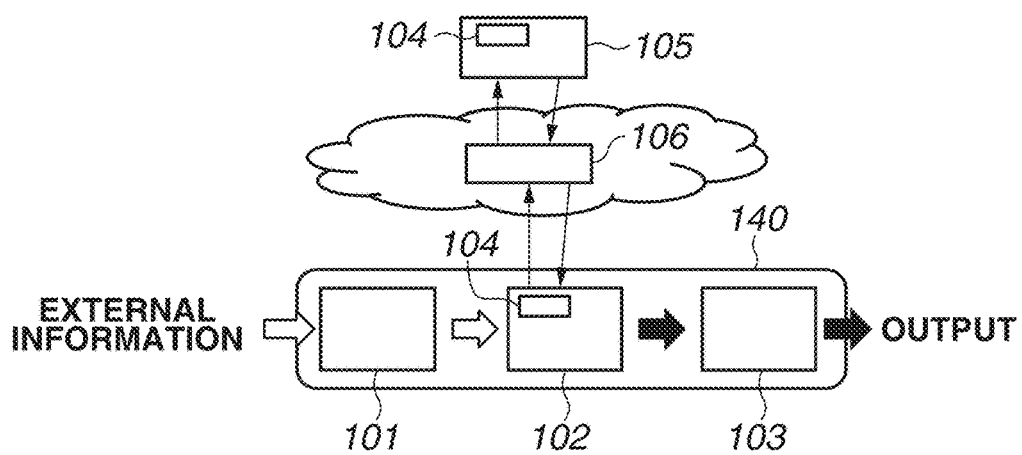
FIG. 1D is a schematic diagram illustrating still another example of the imaging display device according to the first exemplary embodiment.

FIG. 1D is a schematic diagram illustrating a variation example of the imaging display device 100 of the present exemplary embodiment illustrated in FIG. 1A. A processing unit 102 of an imaging display device 140 includes an AI unit 104. The processing unit 102 communicates with a processing apparatus 106, and the processing apparatus 106 further communicates with another processing apparatus 105. The processing apparatus 106 is arranged on the cloud and stores data. The processing apparatus 105 including the AI unit 104 is arranged separately from the imaging display device 140 and the processing apparatus 106. The processing unit 102 and the processing apparatus 106, and the processing apparatus 106 and the processing apparatus 105 are respectively connected to each other via a network. In FIG. 1D, the processing unit 102 receives setting information stored in the processing apparatus 106 and generates prediction image information based on the setting information. The setting information includes basic information about an environment or a target object, and various values used for generating the prediction image information. Further, the processing unit 102 transmits a plurality of pieces of information including the image information from the imaging unit 101 to the processing apparatus 106. The plurality of pieces of information is transmitted to the processing apparatus 105 via the processing apparatus 106. The processing apparatus 105 generates the various values used for generating the prediction image information based on the plurality of pieces of received information, and transmits the generated values to the processing apparatus 106. The processing apparatus 106 updates the basic information and values stored therein and retains the updated information and the various values as new information. As described above, the imaging display device 140 can generate the prediction image information using the information stored in the external apparatus.

In FIG. 1A, the processing unit 102 predicts image information that is to be captured by the imaging unit 101 in the future based on the image information acquired by the imaging unit 101, and transmits the image information to the display unit 103 as prediction image information. Further, the processing unit 102 can process the other types of information such as temperature/humidity information, acceleration information, and pressure information together with the image information. The same can be also said for the processing unit 102 in FIG. 1B, the processing unit 102 and the processing apparatus 105 in FIG. 1C, and the processing unit 102 and the processing apparatuses 105 and 106 in FIG. 1D, which are described in the variation examples.

Figure 2A:
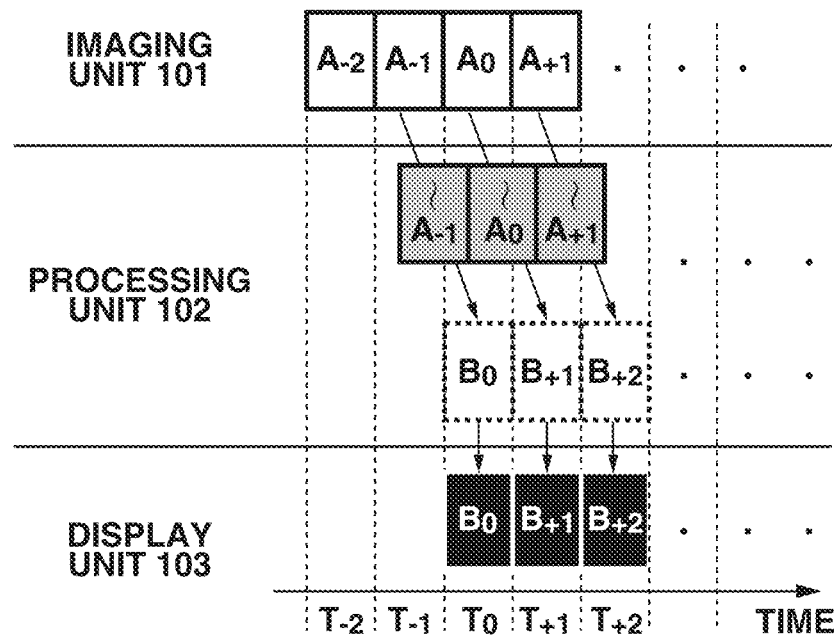
FIGS. 2A and 2B are diagrams illustrating operation of the imaging display device according to the first exemplary embodiment.
Figure 2B:
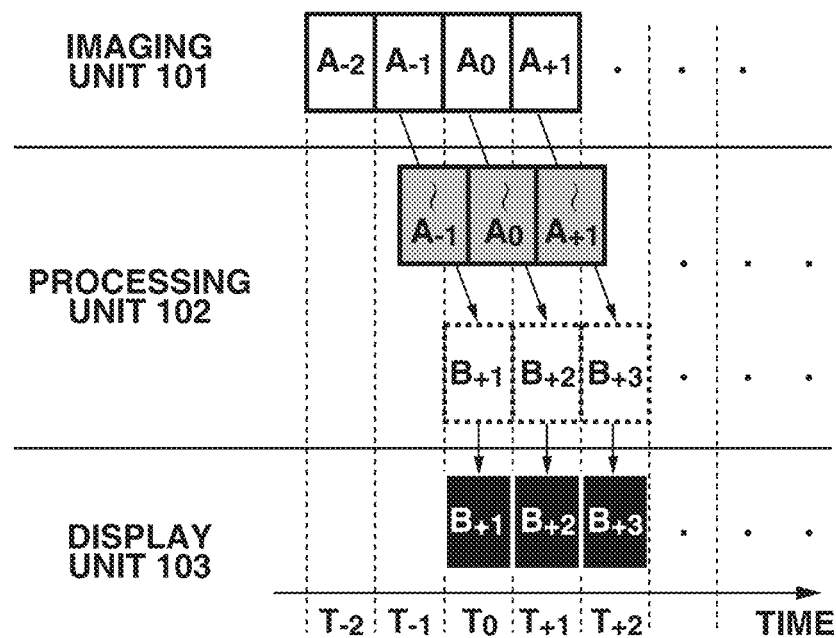

Subsequently, the operation of the imaging display device 100 of the present exemplary embodiment will be described with reference to FIGS. 2A and 2B. FIGS. 2A and 2B are diagrams illustrating the operation of the imaging display device 100 of the present exemplary embodiment and a relationship between image information and prediction image information with respect to one frame at a certain time. In FIGS. 2A and 2B, image information at time Tn is expressed as "An", whereas future image information (prediction image information) processed by the processing unit 102 is expressed as "Bn".

The operation of the imaging display device 100 according to the present exemplary embodiment will be described with reference to FIG. 2A. In this operation, the imaging unit 101 executes imaging operation for acquiring image information $A_{-2}$ at time $T_{-2}$, image information $A_{-1}$ at time $T_{-1}$, image information $A_0$ at time $T_0$, and image information $A_{+1}$ at time $T_{+1}$. Next, the processing unit 102 generates pieces of prediction image information $B_0$, $B_{+1}$, and $B_{+2}$ based on the pieces of input image information $A_{-1}$, $A_0$, and $A_{+1}$, respectively. Then, the processing unit 102 outputs the pieces of prediction image information $B_0$, $B_{+1}$, and $B_{+2}$ to the display unit 103. The display unit 103 executes display operation for displaying an image based on the prediction image information $B_0$ at time $T_0$, an image based on the prediction image information $B_{+1}$ at time $T_{+1}$, and an image based on the prediction image information $B_{+2}$ at time $T_{+2}$.

In other words, the imaging unit 101 executes imaging operation for acquiring the image information $A_{-1}$ at a certain time $T_{-1}$, and executes imaging operation for acquiring the image information $A_0$ different from the image information $A_{-1}$ at the time $T_0$ later than the certain time $T_{-1}$. The display unit 103 executes display operation for displaying an image based on the prediction image information $B_0$ generated based on the image information $A_{-1}$ at the time $T_0$. Further, at the time $T_{+1}$ later than the time $T_0$, the imaging unit 101 executes imaging operation for acquiring the image information $A_{+1}$ different from the image information $A_0$. Then, the display unit 103 executes display operation for displaying an image according to the prediction image information $B_{+1}$ generated from the image information $A_0$.

Herein, a comparison example will be described with reference to FIG. 3. In an imaging display apparatus which does not have the processing unit 102 described in the present exemplary embodiment, the image information $A_{-1}$ captured by the imaging unit 101 at the time $T_{-1}$ is displayed by the display unit 103 at the time $T_0$.

Figure 3:
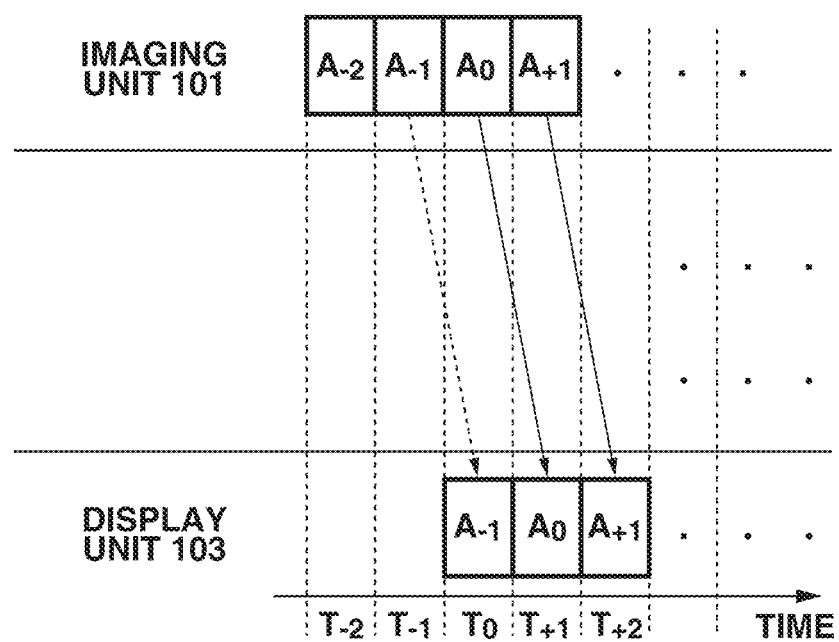
FIG. 3 is a diagram illustrating a comparison example of the operation of the imaging display device according to the first exemplary embodiment.

Difference between a configuration in which the prediction image information of the present exemplary embodiment in FIG. 2A is displayed and a configuration in which the image information captured by the imaging unit 101 in FIG. 3 is displayed as it is will be described. If the current time is the time $T_0$, the image information $A_0$ corresponds to the actual phenomenon (i.e., real image) at that time. Information used as a source of an image to be displayed by the display unit 103 of the present exemplary embodiment is the prediction image information $B_0$. If the image information captured by the imaging unit 101 is used as it is, the information used as a source of the image displayed by the display unit 103 is the image information $A_{-1}$. Herein, an amount of change of the image information is expressed as "(Image Information $A_{-1}$–Image Information $A_0$)≥(Prediction Image Information $B_0$–Image Information $A_0$)". Accordingly, with the configuration described in the present exemplary embodiment, it is possible to acquire an imaging display device that executes reducing a difference between the actual phenomenon and the displayed image.

A timing for displaying the prediction image information of the present exemplary embodiment will be described. The processing unit 102 of the present exemplary embodiment generates prediction image information to reduce the lag time between the image information captured by the imaging unit 101 at a certain time and the image to be displayed by the display unit 103. It is desirable that a timing for displaying the prediction image information be set as follows.

First, it is assumed that an image is captured by the imaging unit 101 at an optional time Tn. The processing unit 102 generates prediction image information based on the image information acquired at the time Tn. The time when the display unit 103 displays an image based on the prediction image information generated with respect to the time Tn is expressed as time Tm. Herein, a difference $\Delta T$ between the imaging timing and the display timing can be expressed by a formula 1.

$$\Delta T = Tn - Tm \quad \text{Formula 1}$$

A display frame rate DFR (fps: frame per second) represents the number of images displayed by the display unit 103 per second. The imaging display device is controlled in such a manner that the difference $\Delta T$ satisfies a formula 2. More preferably, the imaging display device is controlled in such a manner that the difference $\Delta T$ satisfies a formula 3.

$$-2/DFR \leq \Delta T \leq 2/DFR \quad \text{Formula 2}$$

$$-1/DFR \leq \Delta T \leq 1/DFR \quad \text{Formula 3}$$

For example, when the display frame rate is 240 fps, time taken for one image (one frame) to be displayed after being captured is approximately $4 \times 10^{-3}$ sec. Accordingly, the difference $\Delta T$ is expressed as follows.

$$-4 \times 10^{-3} \leq \Delta T \leq 4 \times 10^{-3} \quad \text{Formula 4}$$

By displaying the image based on the prediction image information at the above-described timing, it is possible to display a moving image with a small amount of lag time between the real image and the display image. This moving image display can be called "real-time display". Accordingly, in the present exemplary embodiment, real-time display or, in a precise sense, pseudo real-time display, can be executed. The present disclosure is efficiently applied to a moving image in addition to a still image.

Further, the above-described timing difference can be also used for generating the prediction image information in addition to displaying the image at the above-described timing. Image information captured by the imaging unit 101 at an optional time is expressed as "An". Image information displayed by the display unit 103 at the same time is expressed as "Dn". Herein, a difference between the image information An and the image information Dn, i.e., a temporal difference between the image information An and the image information Dn, can be expressed as $\Delta A = Dn - An$. In the exemplary embodiment in FIG. 2A, the image information Dn is equal to the image information Bn (Dn=Bn). In other words, a temporal difference between the image information captured by the imaging unit 101 at a certain time, i.e., an actual phenomenon (real image) at that time, and the image information displayed by the display unit 103 may be $\pm 4 \times 10^{-3}$ seconds. When the temporal difference between the pieces of image information is $\pm 4 \times 10^{-3}$ sec., an image displayed by the display unit 103 is a delayed image that is delayed for $4 \times 10^{-3}$ sec. with respect to a real image at a certain time, or a future image that is $4 \times 10^{-3}$ sec. after the real image at the certain time. It is desirable that the prediction image information be generated under the above-described condition. In addition, for example, the image information An and the image information Dn can be compared by using raw data of the image information An and the image information Dn. Then, the image information Dn may fall within a range of $\pm 4 \times 10^{-3}$ sec. when a root-mean-square of the difference is calculated. The processing unit 102 sets various parameters for generating next prediction image information by using this difference information.

The lag time occurs when the image information captured by the imaging unit 101 is displayed on the display unit 103 as illustrated in FIG. 3. Particularly, the lag time becomes $100 \times 10^{-3}$ sec. when additional image processing is executed. However, by generating the prediction image information of the present exemplary embodiment, an image without a temporal difference with the real image can be displayed.

Dark-field image processing for increasing the luminance of a dark image, image enlargement processing for enlarging and displaying a small object, and thermal display processing for displaying a thermal image are given as examples of the additional image processing. Through the processing according to the present exemplary embodiment, real-time display can be executed even if additional time is necessary for executing the above-described image processing.

Next, operation illustrated in FIG. 2B will be described. In this operation, the imaging unit 101 executes imaging operation for acquiring image information $A_{-2}$ at a time $T_{-2}$, image information $A_{-1}$ at a time $T_{-1}$, image information $A_0$ at a time $T_0$, and image information $A_{+1}$ at a time $T_{+1}$. The processing unit 102 generates pieces of prediction image information $B_{+1}$, $B_{+2}$, and $B_{+3}$ based on the input image information $A_{-1}$, $A_0$, and $A_{+1}$, respectively. Then, the processing unit 102 outputs the prediction image information $B_{+1}$, $B_{+2}$, and $B_{+3}$ to the display unit 103. The display unit 103 executes display operation for displaying an image based on the prediction image information $B_{+1}$ at the time $T_0$, an image based on the prediction image information $B_{+2}$ at time the $T_{-1}$, and an image based on the prediction image information $B_{+3}$ at the time $T_{+2}$. In other words, the processing unit 102 predicts image information that is to be captured at the time $T_0$ and the display unit 103 displays an image based on the predicted image information at the time $T_0$. In such a manner, information with respect to a future time later than the imaging time can be displayed at the imaging time. By consecutively repeating the above-described operation, images at a future time later than the real image are displayed consecutively, i.e., the image can be displayed as a video image.

Image information used as a source of prediction image information will be described. For example, in FIG. 2A, the prediction image information $B_0$ is generated based on the image information $A_{-1}$. In FIG. 2B, the prediction image information $B_{+1}$ is generated based on the image information $A_{-1}$. In other words, one piece of prediction image information is generated based on one piece of image information. However, one piece of prediction image information may be generated based on two or more pieces of image information. For example, in FIG. 2A, the prediction image information $B_0$ may be generated based on the pieces of image information $A_{-2}$ and $A_{-1}$, and in FIG. 2B, the prediction image information $B_{+1}$ may be generated based on the pieces of image information $A_{-2}$ and $A_{-1}$. Accordingly, the prediction image information can be generated by using at least a piece of image information.

A frame rate of the present exemplary embodiment will be described. First, the number of pieces of image information acquired by the imaging unit 101 per second is defined as an imaging frame rate SFR (fps). Then, as described above, the number of pieces of image information displayed by the display unit 103 per second is defined as a display frame rate DFR (fps). At this time, a relationship between the frame rates in FIGS. 2A and 2B in the present exemplary embodiment is expressed as "SFR=DFR". However, the imaging frame rate and the display frame rate may be different from each other. Specifically, it is desirable that the frame rates satisfy a condition "SFR≥DFR" because prediction image information can be generated from a plurality of pieces of captured image information.

Next, a configuration of the imaging display device 100 will be described. Examples of a photoelectric conversion element included in the imaging unit 101 includes a photodiode, a photogate, and a photoelectric conversion film. For example, silicon, germanium, indium, gallium, and arsenic can be used as the materials of the photodiode and the photogate. A positive-negative (P-N) junction type photodiode, a positive-intrinsic-negative (PIN) type photodiode, and an avalanche type photodiode can be given as the examples of the photodiode.

For example, a complementary metal-oxide semiconductor (CMOS) image sensor can be used as the imaging unit 101, and the CMOS image sensor may be a front-face illumination type or a back-face illumination type. Further, the CMOS image sensor may have a structure in which a semiconductor substrate having a photodiode arranged thereon and a semiconductor substrate having a scanning circuit and a control circuit arranged thereon are laminated on each other.

Further, a material of the photoelectric conversion film may be an organic material or an inorganic material. The organic photoelectric conversion film has a structure having at least one organic layer for executing photoelectric conversion, which is arranged at a position between a pair of electrodes. The organic photoelectric conversion film may also have a structure having a plurality of organic layers laminated and arranged at a position between a pair of electrodes. The organic layer may be made of a single material or a plurality of materials mixed together. Further, the organic layer can be formed by vacuum vapor deposition processing or coating processing. For example, a quantum-dot type photoelectric conversion film using a quantum-dot thin-film layer containing fine semiconductor crystals instead of an organic layer, or a perovskite-type photoelectric conversion film including a photoelectric conversion layer consisting of transition metal oxide having a perovskite structure is used as the inorganic photoelectric conversion film.

The display unit 103 includes a plurality of light emitting elements. The light emitting element may be a liquid crystal display (LCD), an inorganic light emitting diode (LED), an organic LED (OLED), or a quantum dot LED (QLED). For example, materials such as aluminum, gallium, arsenic, phosphorus, indium, nitrogen, selenium, zinc, diamond, zinc oxide, and/or a perovskite semiconductor are used for the inorganic LED. The inorganic LED having the P-N junction structure formed by using the above-described materials emits light having energy (wavelength) corresponding to a bandgap between the above-described materials. For example, the organic LED includes a light emitting layer containing at least one organic light emitting material arranged at a position between a pair of electrodes. The organic LED may include a plurality of light emitting layers, and may have a structure having a plurality of organic layers laminated one on top of the other. The light emitting layer may be made of a single material or a plurality of materials mixed together. Light emitted from the light emitting layer may be fluorescent light or phosphorescence light, and the light may be monochromatic light (e.g., blue, green, or red light) or white light. Further, the organic layer can be formed by vacuum vapor deposition processing or coating processing.

Further, the imaging display device may have a structure in which at least three chips of the imaging unit 101, the processing unit 102, and the display unit 103 are laminated and electrically connected to each other by semiconductor processing.

In a case where the imaging display device 100 of the present exemplary embodiment is used as a wearable device, it is desirable that an amount of data to be processed by the processing unit 102 be as small as possible. This is because the wearable device needs to be reduced in size, weight, and thickness as much as possible, and a chip size of the processing unit 102 can be reduced further if a data processing load is smaller. In order to reduce the data processing load, the AI processing may be executed by another apparatus (e.g., one provided on the cloud) as illustrated in FIG. 1C or 1D. Further, a method for lowering the resolution of a portion other than the line-of-sight area, a method for processing a portion other than the line-of-sight area to be a still image, or a method for processing a portion other than the line-of-sight area in monochrome instead of color can be used as a method for reducing a processing amount.

If it takes long time to capture and display an image of an actual phenomenon such as scenery, there arises a difference between the actual phenomenon and the displayed image. For example, if there is a difference between the actual phenomenon and the display image, the user cannot perform operation for capturing a moving object. However, according to the present exemplary embodiment, it is possible to provide an imaging display device that executes reducing a temporal difference between the actual phenomenon and the display image. Therefore, it is possible to perform the operation for capturing a moving object.

Figure 4:
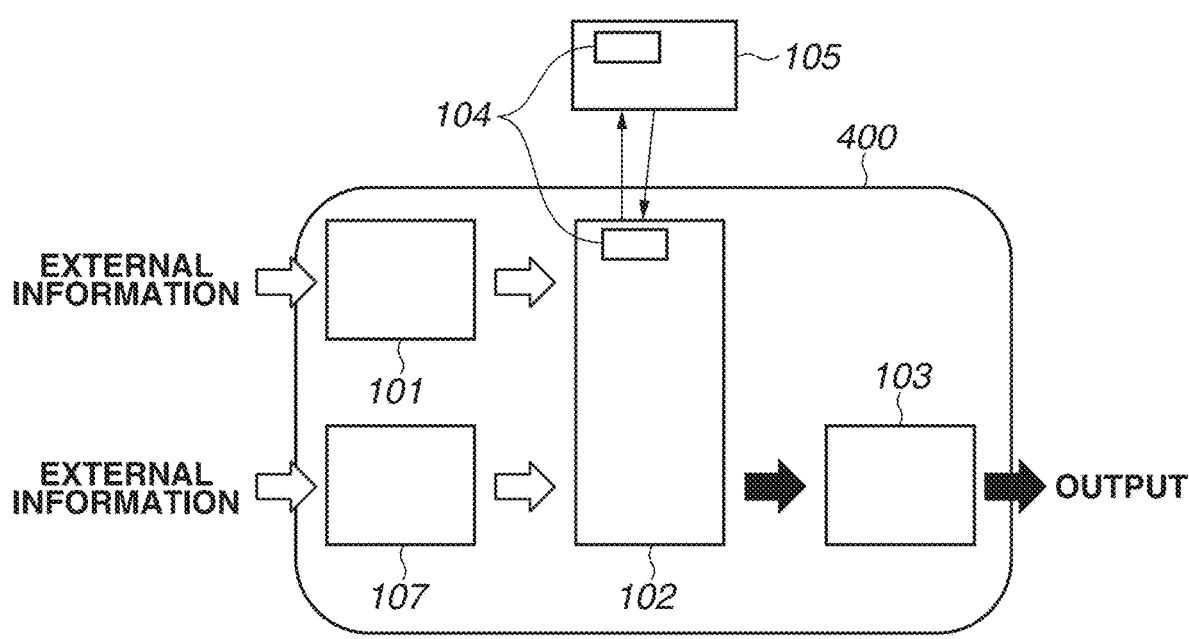
FIG. 4 is a schematic diagram illustrating an imaging display device according to a second exemplary embodiment.

Hereinafter, a second exemplary embodiment will be described. The present exemplary embodiment will be described with reference to FIGS. 4 and 5. FIG. 4 is a schematic diagram illustrating an imaging display device 400 according to the present exemplary embodiment. Similar to the imaging display device 130 illustrated in FIG. 1C, the imaging display device 400 includes an imaging unit 101, a processing unit 102, a display unit 103, and a processing apparatus 105. The imaging display device 400 further includes a detection unit 107 for detecting environmental information. In the imaging display device 400, each of the processing unit 102 and the processing apparatus 105 includes an AI unit 104.

The detection unit 107 includes at least one sensor. The sensor can detect at least a piece of environmental information. Information about atmospheric temperature, water temperature, humidity, atmospheric pressure, water pressure, and luminance are given as examples of the environmental information. Further, the detection unit 107 may also acquire physical information such as an acceleration rate of an object captured by the imaging unit 101. In the present exemplary embodiment, although the detection unit 107 is built into the imaging display device 400, the detection unit 107 may be externally arranged.

For example, prediction image information is generated by the AI unit 104 having a deep learning function based on the image information acquired from the imaging unit 101 and the environmental information acquired from the detection unit 107. At this time, prediction image information with respect to a time in which time taken for the processing unit 102 to execute processing is taken into consideration is generated. In other words, if an image is captured at a certain time, prediction image information with respect to a future time is generated while adding time necessary for executing processing to the certain time in addition to time taken for capturing and displaying the image. Details of the operation are similar to the details described in the first exemplary embodiment.

Subsequently, processing executed by the AI unit 104 will be described using a scene where persons are playing baseball as an example. FIG. 5 is a diagram illustrating the operation of the imaging display device of the present exemplary embodiment. FIG. 5 illustrates four types of examples of images captured at four different times $T_{-3}$, $T_{-2}$, $T_{-1}$, and $T_0$.

A real image (in the light) in FIG. 5 illustrates a real image. Herein, the real image refers to an image captured by the imaging unit 101 at each of times $T_{-3}$, $T_{-2}$, $T_{-1}$, and $T_0$. The real image (in the light) illustrates a real image captured at each of the times $T_{-3}$, $T_{-2}$, $T_{-1}$, and $T_0$ when persons are playing baseball in a bright environment (in the light). Because a pitcher and a ball can be recognized clearly, a batter can hit and return the ball at the time $T_0$.

A real image (in the dark) illustrates a real image. Herein, the real image refers to the image captured by the imaging unit 101 at each of times $T_{-3}$, $T_{-2}$, $T_{-1}$, and $T_0$. The real image (in the dark) illustrates a real image captured at each of the times $T_{-3}$, $T_{-2}$, $T_{-1}$, and $T_0$ when the persons are playing baseball in a dark environment (in the dark). Since a ball cannot be seen by the naked eyes in such a dark environment, the batter cannot hit and return the ball at the time $T_0$. Therefore, although movement and positions of the pitcher and the ball in the real images in the light and the real images in the dark are the same at the respective times $T_{-3}$, $T_{-2}$, and $T_{-1}$, different results are acquired at the time $T_0$.

The images of a comparison example illustrate a case in which the imaging display device of the comparison example is used when persons are playing baseball in the dark will be described. The images of the comparison example represent images acquired by additionally executing image processing on the real images captured in the dark and displayed on the imaging display device. Even in a state illustrated in the real images captured in the dark, where the object cannot be seen by the naked eyes, images just like the real images captured in the light can be displayed by executing additional processing on the captured image information. The additional image processing is processing for increasing the luminance of an image captured in the dark. By executing the above processing, the ball is visible to the batter. Because of the lag time, however, a position of the ball at the time $T_{-1}$ is different from the position in the real image. Therefore, the batter cannot hit and return the ball at the time $T_0$.

In the images of the present exemplary embodiment, an exemplary embodiment in which the imaging display device of the present exemplary embodiment is used when persons are playing baseball in the dark will be described. The images of the present exemplary embodiment are images displayed on the imaging display device 100 after additional image processing is executed on the real images captured in the dark. Even in a state illustrated in the real images captured in the dark, where the object cannot be seen by the naked eyes, images just like the real images captured in the light can be displayed by executing additional processing on the captured image information. Further, images using the prediction image information which do not have lag time, as described in the imaging display device 100 of the present exemplary embodiment, can be displayed. Accordingly, the batter can hit and return the ball at the time $T_0$ as if the batter is playing baseball in the light. At the times $T_{-3}$, $T_{-2}$, $T_{-1}$, and $T_0$, movement and positions of the pitcher and the ball in the images of the present exemplary embodiment and those in the real image captured in the light are substantially the same.

As in the present exemplary embodiment, images can be displayed in real time by the imaging display device using the prediction image information. Thus, a position of a moving object such as a ball can be recognized precisely. Further, by use of the prediction image information, images can be displayed in real time even if the additional processing is executed on the captured image information. The imaging display device according to the present exemplary embodiment is desirable for capturing and displaying movement of a moving object in sports such as baseball.

Further, in the example illustrated in FIG. 5, the detection unit 107 detects information about a wind direction and a wind speed and outputs the detected information to the processing unit 102. Based on the above information to predict a speed or a course of the ball, the processing unit 102 generates the prediction image information on the ball. Further, the detection unit 107 can determine whether the additional image processing is to be executed by the processing unit 102 by detecting luminance information.

Further, in the imaging display device 400 of the present exemplary embodiment, it is desirable that the imaging frame rate SFR be greater than the display frame rate DFR. For example, the imaging frame rate SFR and the display frame rate DFR may be set to 500 fps and 60 fps, respectively. Because the imaging frame rate SFR is greater than the display frame rate DFR (SFR>DFR), one piece of prediction image information can be generated based on a number of pieces of image information. Therefore, an agreement rate between the display image and the real image is increased, so that movement of the moving object can be displayed precisely.

Further, various types of information transmitted to the external processing apparatus 105 in FIG. 1D include various types of information acquired by the detection unit 107 of the present exemplary embodiment illustrated in FIG. 4. For example, pitching data of a battery, data on a pitching form of a pitcher, weather information, and user (batter) information are basic information stored in the processing apparatus 106.

Figure 6A:
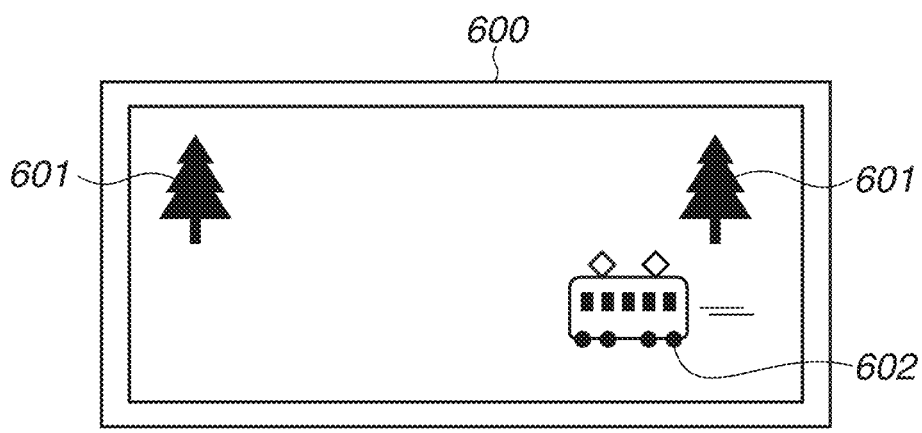
FIGS. 6A and 6B are diagrams illustrating operation of an imaging display device according to a third exemplary embodiment.
Figure 6B:
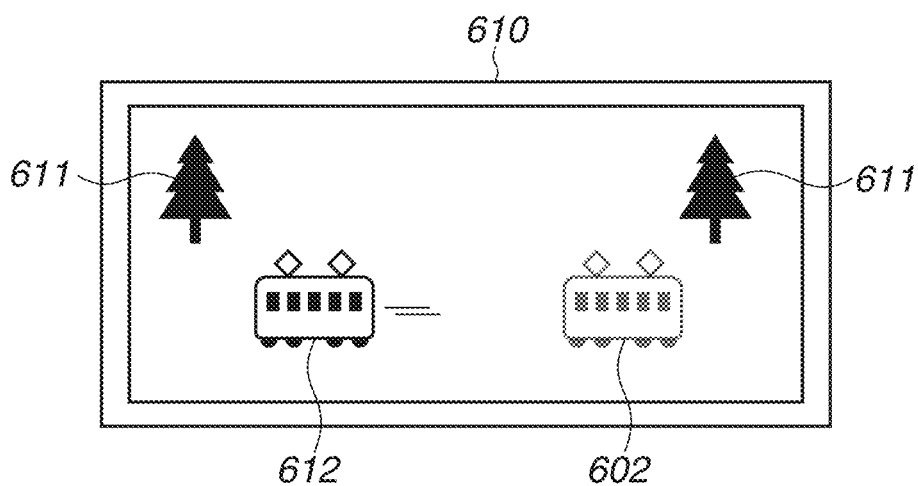

Hereinafter, a third exemplary embodiment will be described. In the present exemplary embodiment, another operation of the imaging display device 400 described in the second exemplary embodiment will be described. FIGS. 6A and 6B are diagrams illustrating the operation of an imaging display device of the present exemplary embodiment. FIG. 6A illustrates a real image, whereas FIG. 6B illustrates an image based on prediction image information.

The real image illustrated in FIG. 6A can be referred to as image information 600 acquired by the imaging unit 101 at a certain time. The processing unit 102 detects a moving object 602 by using image information captured before the certain time and at least two pieces of image information included in the image information 600. Characteristic still objects 601 in the scenery may be detected simultaneously. The characteristic still objects 601 can be identified by line-of-sight detection described below. The line-of-sight detection refers to an eye tracking. In FIG. 6A, for example, two trees are the characteristic still objects 601, and a train is the moving object 602. Subsequent image processing methods will be described.

One of the image processing methods is a method in which prediction image information is partially generated by the AI unit 104 with respect to only a portion determined as the moving object 602 in the image information. Then, prediction image information based on the image information about the still object 601 is not generated because the real image of the still object 601 is less likely to be changed. Prediction image information 610 generated by the above method is illustrated in FIG. 6B. For illustrative purposes, the moving object 602 in FIG. 6A remains illustrated in FIG. 6B. In the prediction image information 610, a position of a moving object 612 is different from a position of the moving object 602, and positions of still objects 611 are not changed from the positions of the still objects 601 (not illustrated). Through the above-described processing, a load of the processing unit 102 can be reduced while displaying the image in real time.

Another image processing method is a method in which additional image processing is further executed with respect to only a portion determined as the moving object 602. In the additional image processing, resolution of the portion determined as the moving object 602 is improved and/or refined, whereas resolution of each of portions determined as the still objects 601 is lowered. The high-resolution moving object 612 and the low-resolution still objects 611 are displayed on the display unit 103. Because processing is changed depending on the portion, a load of the processing unit 102 can be reduced. Further, because the moving object 612 is displayed at high resolution and the still objects 611 are displayed at low resolution, a natural image close to an image seen by the human eyes can be provided.

Yet another image processing method is a method in which prediction image information is generated with respect to a portion of a still object in the periphery of the moving object 602 if there is time before outputting a signal to the display unit 103 after the prediction image information is generated with respect to the moving object 602. With this method, an image with higher precision can be displayed in real time.

As described above, the processing unit 102 executes moving object detection on the image data received from the imaging unit 101 and changes the processing method depending on the portion. With this processing method, an image can be displayed with a high quality while reducing a load of the processing unit 102.

In addition, a method other than a method using two or more pieces of image information is also provided as a method for detecting a still object and a moving object. For example, a moving object detection unit may be provided as the detection unit 107. The moving object detection unit may include a range-finding sensor. The number of the still objects 601 and the moving objects 602 to be detected by the moving object detection unit is not limited.

Figure 7:
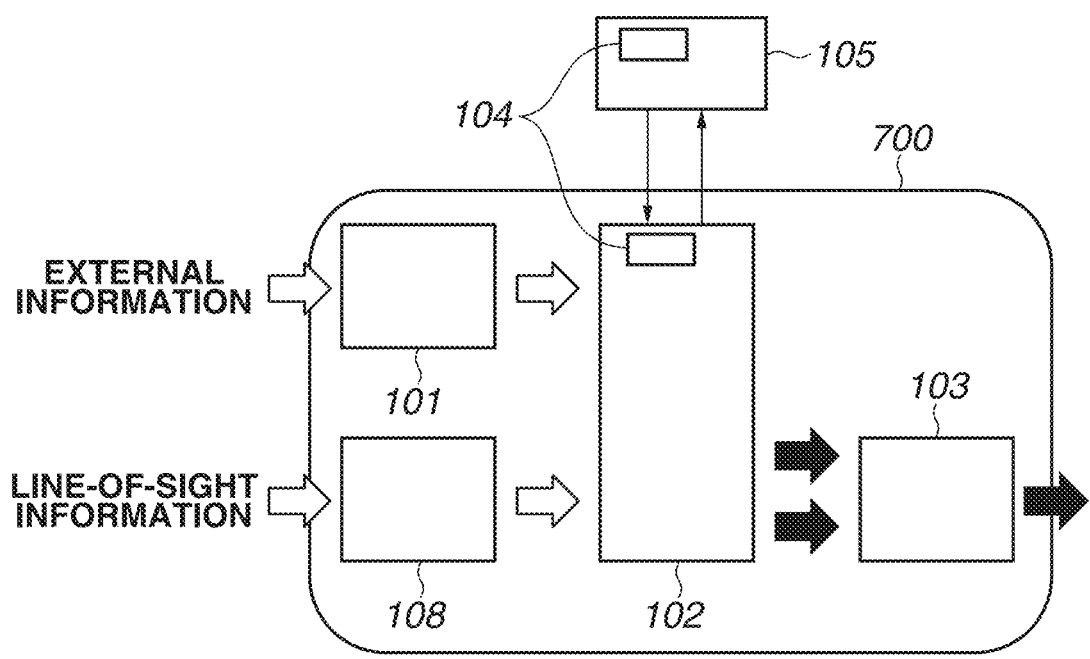
FIG. 7 is a schematic diagram illustrating an imaging display device according to a fourth exemplary embodiment.

Hereinafter, a fourth exemplary embodiment will be described. An imaging display device of the present exemplary embodiment will be described with reference to FIGS. 7 and 8. FIG. 7 is a schematic diagram illustrating an imaging display device 700 of the present exemplary embodiment. The imaging display device 700 includes a line-of-sight detection unit 108 in place of the detection unit 107 included in the imaging display device 400 illustrated in FIG. 4. In FIG. 7, the line-of-sight detection unit 108 is built into the imaging display device 700. Alternatively, the line-of-sight detection unit 108 may be arranged externally.

In FIG. 7, image information captured by the imaging unit 101 is output to the processing unit 102. At the same time, line-of-sight information acquired by the line-of-sight detection unit 108 is output to the processing unit 102. The processing unit 102 generates prediction image information by the AI unit 104. Further, the processing unit 102 generates prediction line-of-sight information by predicting movement and a position of the line-of-sight in the future based on the line-of-sight information. Then, based on the prediction line-of-sight information, the processing unit 102 executes additional image processing for improving the resolution of a portion where a line-of-sight exists and lowering the resolution of a portion other than the portion where the line-of-sight exists, and generates final prediction image information. While real time display is being executed, the display unit 103 can display the portion where the predicted line-of-sight exists at high resolution, and display the portion other than the portion where the predicted line-of-sight exists at low resolution.

Figure 8:
FIG. 8 is a diagram illustrating operation of an imaging display device according to a fifth exemplary embodiment.

This operation will be described in detail with reference to FIG. 8. FIG. 8 is a diagram illustrating the operation of the imaging display device of the present exemplary embodiment. Similar to FIG. 5, FIG. 8 illustrates a scene in which persons are playing baseball. FIG. 8 illustrates examples of three types of images captured at four different times $T_{-3}$, $T_{-2}$, $T_{-1}$, and $T_0$.

The real image refers to an image captured at each of the times $T_{-3}$, $T_{-2}$, $T_{-1}$, and $T_0$. A batter hits and returns a ball at the time $T_0$. The descriptive image schematically illustrates a line-of-sight (line-of-sight area) on a real image. The line-of-sight is detected by the line-of-sight detection unit 108. In the descriptive image, a line-of-sight is adjusted to a ball and is moved along with the movement of the ball. The image of the present exemplary embodiment is an image obtained using the prediction line-of-sight information of the present exemplary embodiment. This image is based on the prediction image information on which image processing for improving the resolution of the portion where the line-of-sight exists and lowering the resolution of the portion other than the portion where the line-of-sight exists is executed additionally. A portion of the ball is displayed at high resolution, and a portion of the pitcher is displayed at low resolution. By the above-described processing, a high quality image can be displayed in real time while reducing the load of the processing unit 102.

Although the imaging display device 700 includes the line-of-sight detection unit 108 in place of the detection unit 107 illustrated in FIG. 4, the imaging display device 700 may include both of the detection unit 107 and the line-of-sight detection unit 108. The configuration thereof can be changed as appropriate. Further, the line-of-sight detection unit 108 can employ an optional method such as a method for detecting a position of the iris of the eye or a method using corneal reflection by emitting infrared light.

Figure 9:
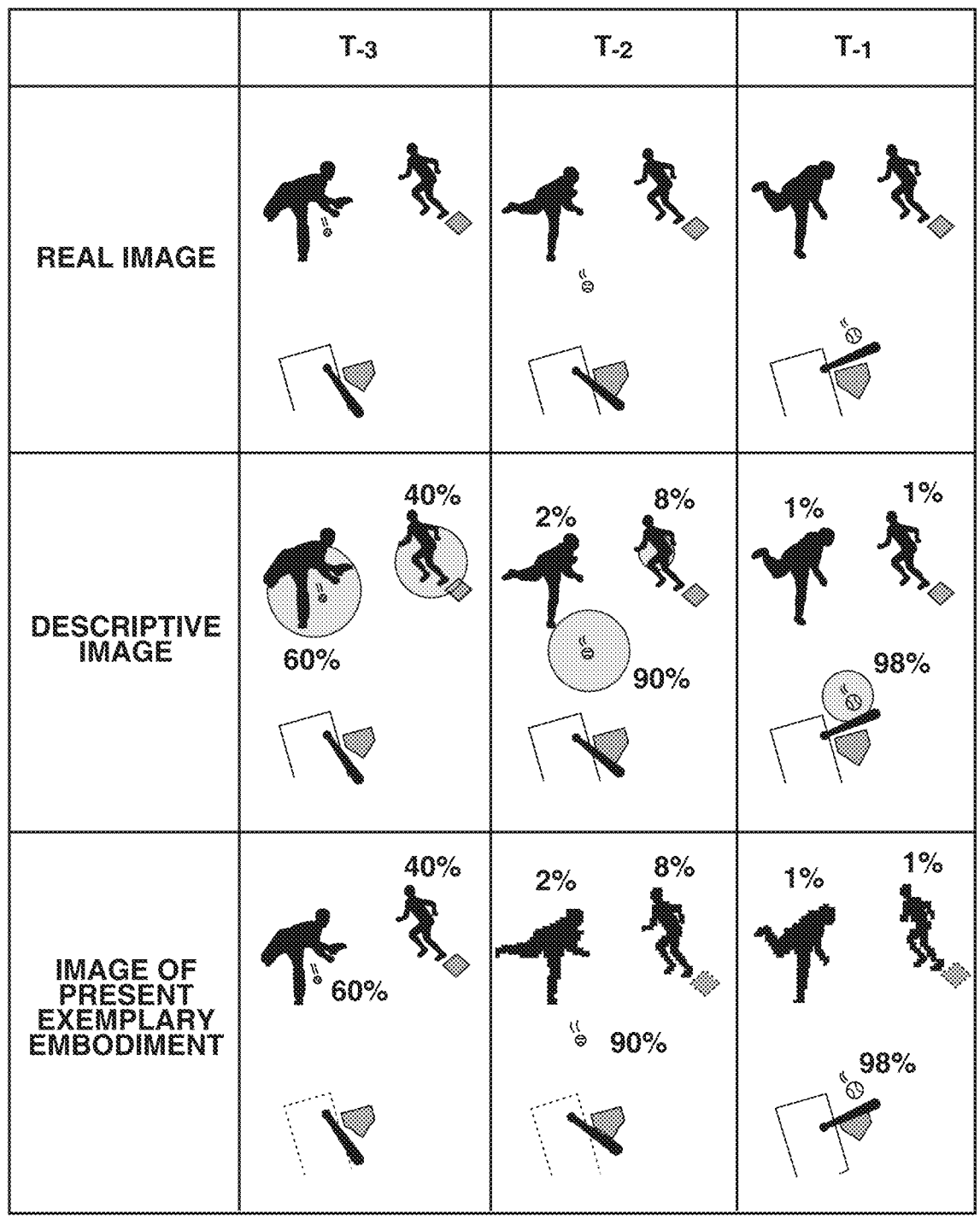
FIG. 9 is a diagram illustrating operation of an imaging display device according to a sixth exemplary embodiment.

Hereinafter, a fifth exemplary embodiment will be described. In the present exemplary embodiment, a processing method to be executed when the line-of-sight detection unit 108 of the fourth exemplary embodiment detects a plurality of line-of-sight areas will be described with reference to FIG. 9. FIG. 9 is a diagram illustrating the operation of the imaging display device of the present exemplary embodiment. Similar to FIG. 8, FIG. 9 is a diagram illustrating a scene in which persons are playing baseball. FIG. 9 illustrates three types of examples of images captured at three different times $T_{-3}$, $T_{-2}$, and $T_{-1}$. In the present exemplary embodiment, prediction image information in which a plurality of line-of-sight areas is weighted and processed to resolution based on the weighting is generated. The display unit 103 displays images of portions corresponding to the line-of-sight areas at resolution based on the weighting, and images of portions other than the line-of-sight areas at low resolution.

The operation will be described in detail with reference to FIG. 9. A real image is an image captured at each of the times $T_{-3}$, $T_{-2}$, and $T_{-1}$. Each of the real images includes a pitcher and a runner on first base, and a batter is about to hit and return the ball at the time $T_{-1}$.

The descriptive image of FIG. 9 schematically illustrates a line-of-sight area on a real image. A weighting value (%) is indicated for each of the line-of-sight areas. At the time $T_{-3}$, a line-of-sight of the batter is adjusted to the ball thrown by the pitcher and to the runner. Herein, the line-of-sight area on the ball is weighted by 60%, and the line-of-sight area on the runner is weighted by 40%. At the time $T_{-2}$, the line-of-sight of the batter is adjusted to the ball. Therefore, the line-of-sight areas on the ball, the runner, and the pitcher are weighted by 90%, 8%, and 2%, respectively. At the time $T_{-1}$, the line-of-sight of the batter is mostly adjusted to the ball. The line-of-sight areas on the ball, the runner, and the pitcher are weighted by 98%, 1%, and 1%, respectively. This weighting is executed by the processing unit 102, and a value of the weighting may be determined based on the movement of the line-of-sight detected by the line-of-sight detection unit 108. Alternatively, the determination may be executed by another AI unit 104.

The image of the present exemplary embodiment illustrated in FIG. 9 is an image using the prediction line-of-sight information according to the present exemplary embodiment. The processing unit 102 adjusts resolution of a portion based on the weighting of the line-of-sight area illustrated in the descriptive image, and generates prediction image information. Each value illustrated in the image of the present exemplary embodiment represents a ratio of resolution, and this is a value when the maximum resolution is 100%. The portions other than the line-of-sight area can be displayed at the minimum resolution. With this configuration, an image close to an image seen by the human eyes can be displayed, and a processing load of the processing unit 102 can also be reduced.

Hereinafter, a sixth exemplary embodiment will be described. An imaging display device of the present exemplary embodiment can display an image using light (near-infrared light, infrared light, and ultraviolet light) other than visible light. For example, in the imaging display device 400 illustrated in FIG. 4, the imaging unit 101 includes a photoelectric conversion element that executes detecting a visible light area and a photoelectric conversion element that executes detecting light of a wavelength band falling outside the visible light area. For example, the imaging unit 101 includes at least two area sensors. On one of the two area sensors a photoelectric conversion element for visible light is arranged, and on the other area sensor, a photoelectric conversion element for non-visible light is arranged. Alternatively, the imaging unit 101 includes one area sensor. The area sensor includes at least one photoelectric conversion element for visible light and one photoelectric conversion element for non-visible light.

By the above-described imaging unit 101, an image signal of the non-visible light area including a near infrared light area can be acquired in addition to the image information on the visible light area. Based on the above-described image information, the processing unit 102 generates prediction image information on one visible light area. With this configuration, an image with improved and/or refined sensitivity can be displayed even in a state where sensitivity is low in a visible light area. In other words, an image that cannot be seen by the human eyes is also displayed in real time by the imaging display device of the present exemplary embodiment. The above-described imaging display device of the present exemplary embodiment is applicable to, for example, a night-vision device, a monitoring device, binoculars, a telescope, and a medical detection device.

Hereinafter, a seventh exemplary embodiment will be described. In the above-described exemplary embodiment, prediction image information is generated by AI processing using a deep learning function. In the present exemplary embodiment, a trained model established through machine learning is used. Data is collected from specialists, and a trained model is established based on the collected data. Then, an imaging display device in which prediction image information is generated based on the data collected from the specialists is applied to a non-specialist. For example, data is acquired from professional athletes, and a trained model is established based on the acquired data. Then, prediction image information is generated by an AI unit using this trained model. By using the imaging display device of the present exemplary embodiment, a non-professional athlete can virtually experience a line-of-sight or attentiveness of a professional athlete, so that the athletic skill of the non-professional athlete can be improved and/or refined within a shorter period of time. The present exemplary embodiment is also applicable to a field where inheritance of specialized skills of an expert is desired. For example, the present exemplary embodiment is applicable to occupations in various fields that require specialized skills, such as a pilot, a doctor, a traditional craftsman, and a security/safety service.

Hereinafter, an eighth exemplary embodiment will be described. An application example of the imaging display device according to each of the above-described exemplary embodiments when applied to a wearable device will be described with reference to FIGS. 10A to 10E. The imaging display device can be applied to a wearable device, such as a smart-glass, a head-mounted display (HMD), or a smart contact lens.

Figure 10A:
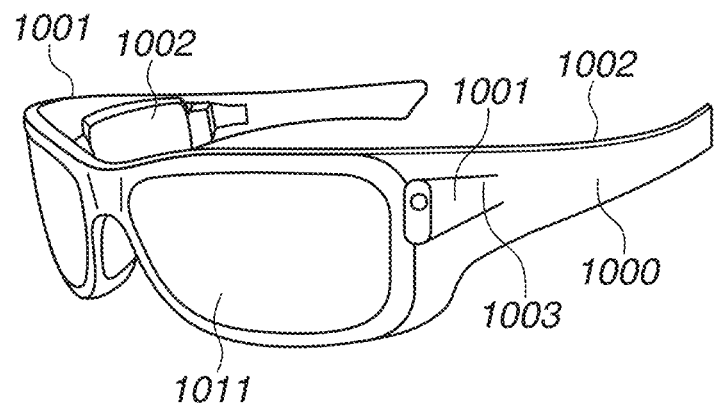
FIGS. 10A and 10B are schematic diagrams illustrating a wearable device.

FIG. 10A is a schematic diagram illustrating a smart-glass 1000. The smart-glass 1000 is also called as an eyeglass-type imaging display device or eyeglasses. The smart-glass 1000 includes an eyeglass frame and an imaging display device according to the above-described exemplary embodiments. Specifically, the smart-glass 1000 includes at least two imaging units 1001, a processing unit 1002, and a display unit 1003. The two imaging units 1001 are arranged on side faces of the eyeglass frame, and the processing unit 1002 is housed within a temple of the eyeglasses. The display unit 1003 is arranged on an optional position depending on a display form, and may be included in a lens 1011. In any of the cases, the display unit 1003 displays an image on the lens 1011. The processing unit 1002 may include an AI unit. The smart-glass 1000 may include an external interface, so that the processing unit 1002 may exchange data with an external AI unit.

The smart-glass 1000 in FIG. 10A may include two respective imaging display devices for the right and left eyes. In this case, timings for capturing and displaying images can be optionally set in the respective imaging display devices for the right and left eyes. Specifically, images can be captured simultaneously and displayed at different times, or images can be captured at different times and displayed simultaneously.

Figure 10B:
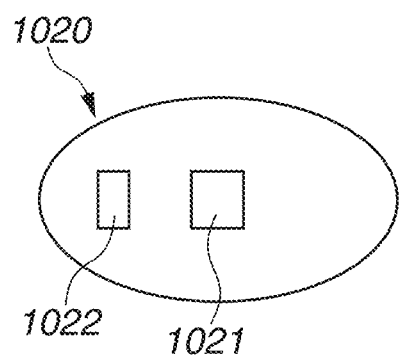

FIG. 10B is a schematic diagram illustrating a smart contact lens 1020. The smart contact lens 1020 is also called as a contact lens-type imaging display device or a contact lens. The smart contact lens 1020 includes one imaging display device 1021 and one control device 1022. The control device 1022 functions as a power source unit for supplying power to the imaging display device 1021. The control device 1022 includes an AI unit and supports a processing unit of the imaging display device 1021. In addition, the AI unit may be arranged on a terminal different from the smart contact lens 1020. It is desirable that an optical system for collecting light to the imaging display device 1021 be arranged on the smart contact lens 1020. The power source unit includes an interface for connecting the power source to an external portion. The power source unit may be connected to the external portion and charged via wired connection or wireless connection.

A transparent material is used as base materials of the lens 1011 in FIG. 10A and the smart contact lens 1020 in FIG. 10B, and a display unit of the imaging display device projects a display image on a transparent lens portion. At this time, an image based on the prediction image information at a future time later than a display time as illustrated in FIG. 2B can be displayed, so that the user can see both of the real image and a prediction image in the future. Because image information at the time slightly later than the current time can be displayed in real time, for example, the user playing outfield in baseball can take a defensive position in advance by moving in a direction of a ball hit by the batter. At this time, the user can realize a higher level of athletic performance than the actual athletic performance level of the user because the user can see both of the real image and the prediction image. Further, the imaging display device can freely adjust the timing for displaying the acquired image information. With this configuration, the operation suitable for the user can be selected.

Figure 10C:
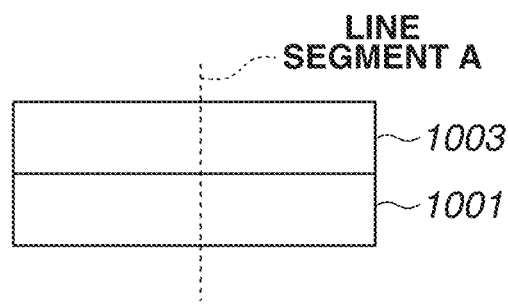
FIG. 10C is a cross-sectional diagram schematically illustrating a positional relationship between an imaging unit and a display unit.
Figure 10D:
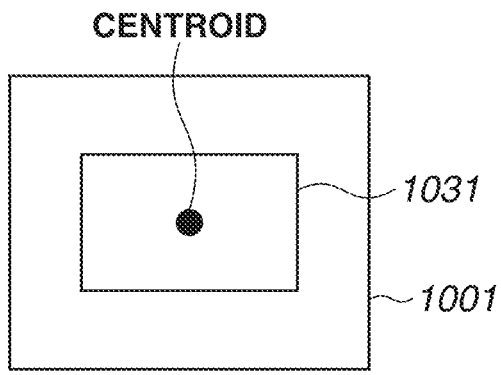
FIGS. 10D and 10E are planar diagrams schematically illustrating a positional relationship between the imaging unit and the display unit.
Figure 10E:
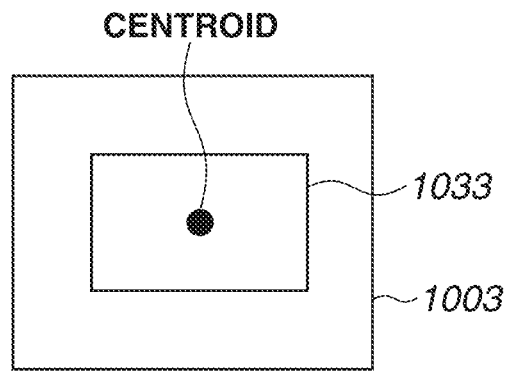

As illustrated in FIG. 10A, the imaging unit 1001 and the display unit 1003 may be arranged at different positions, or may be laminated and arranged on the line-of-sight. FIG. 10C is a cross-sectional schematic diagram illustrating the imaging unit 1001 and the display unit 1003. FIG. 10D is a planar schematic diagram of the imaging unit 1001 and the display unit 1003 viewed from a side of the imaging unit 1001. FIG. 10E is a planar schematic diagram of the imaging unit 1001 and the display unit 1003 viewed from a side of the display unit 1003. FIG. 10D illustrates a centroid of an imaging area 1031 where pixels of the imaging unit 1001 are arrayed. FIG. 10E illustrates a centroid of a display area 1033 where pixels of the display unit 1003 are arrayed. As illustrated in FIG. 10C, it is desirable that the imaging unit 1001 and the display unit 1003 be arranged in such a state that a line segment A passes through the two centroids. With this configuration, it is possible to reduce variation in the wearable devices, which is caused by difference in position between the captured image information and a display image.

Figure 11:
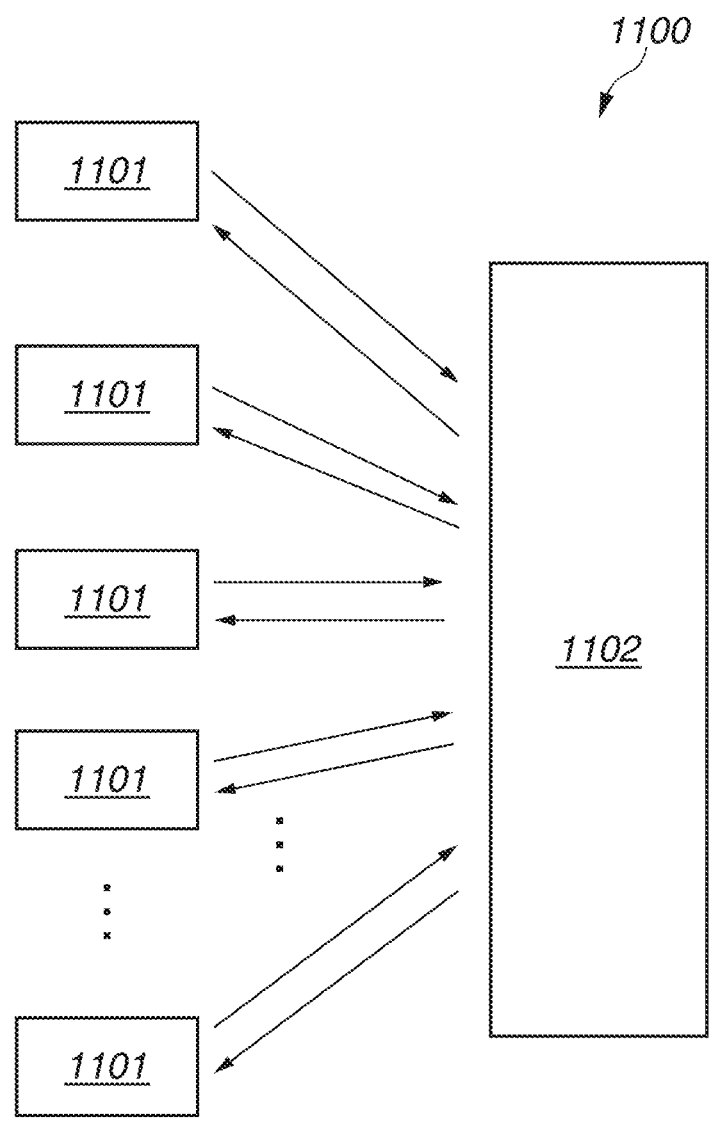
FIG. 11 is a schematic diagram illustrating an imaging display system.

Hereinafter, a ninth exemplary embodiment will be described. In the present exemplary embodiment, an imaging display system will be described. FIG. 11 is a schematic diagram illustrating an imaging display system 1100. The imaging display system 1100 of the present exemplary embodiment includes a plurality of imaging display devices 1101 and at least one control device 1102. The imaging display device 1101 may be an imaging display device described in any one of the exemplary embodiments, e.g., the imaging display device 100 illustrated in FIG. 1A.

The plurality of imaging display devices 1101 can receive and transmit signals from and to the control device 1102. Each of the imaging display devices 1101 and the control device 1102 includes an external interface unit for executing wired or wireless communication. The control device 1102 receives signals from the plurality of imaging display devices 1101 and outputs signals for controlling the plurality of imaging display devices 1101. The control device 1102 may include a part of the functions of the processing units 102 of the imaging display devices 1101. The imaging display system 1100 may further include a data storage unit, a control unit, and a processing unit. For example, the imaging display system 1100 may include the processing apparatus 105 or 106 illustrated in FIG. 1D. In this case, the control device 1102 can communicate with the processing apparatus 105 or 106.

For example, the imaging display system 1100 of the present exemplary embodiment can display an image on a single display unit 103 by using pieces of image information acquired from a plurality of respective imaging units 101 included in a plurality of imaging display devices 100. Specifically, for example, when a plurality of users uses the respective imaging display devices 100, pieces of image information is acquired from the plurality of imaging display devices 100, and images can be displayed on another imaging display device 100 used by a user different from the plurality of users in real time. For example, line-of-sight images of professional athletes playing in the same athletic filed can be concurrently seen by at least one spectator in real time.

Further, images may be displayed on a plurality of display units 103 using the image information acquired from a single imaging unit 101. Specifically, image information acquired from one imaging display device 100 can be displayed on a plurality of imaging display devices 100 different from the one from which the image information is acquired in real time. For example, a line-of-sight image of one professional athlete can be concurrently viewed by a plurality of spectators in real time.

As described above, by virtually experiencing the line-of-sight of the professional athlete, the spectator can view an image with a sense of presence which makes the spectator feel as if the spectator himself exists in the athletic field.

Further, this system allows respective display apparatuses to execute imaging operation or display operation at different intervals. Further, in the system, image information and various types of information acquired by a plurality of imaging display devices can be shared and used for creating pieces of prediction image information on the plurality of imaging display devices.

Figure 12:
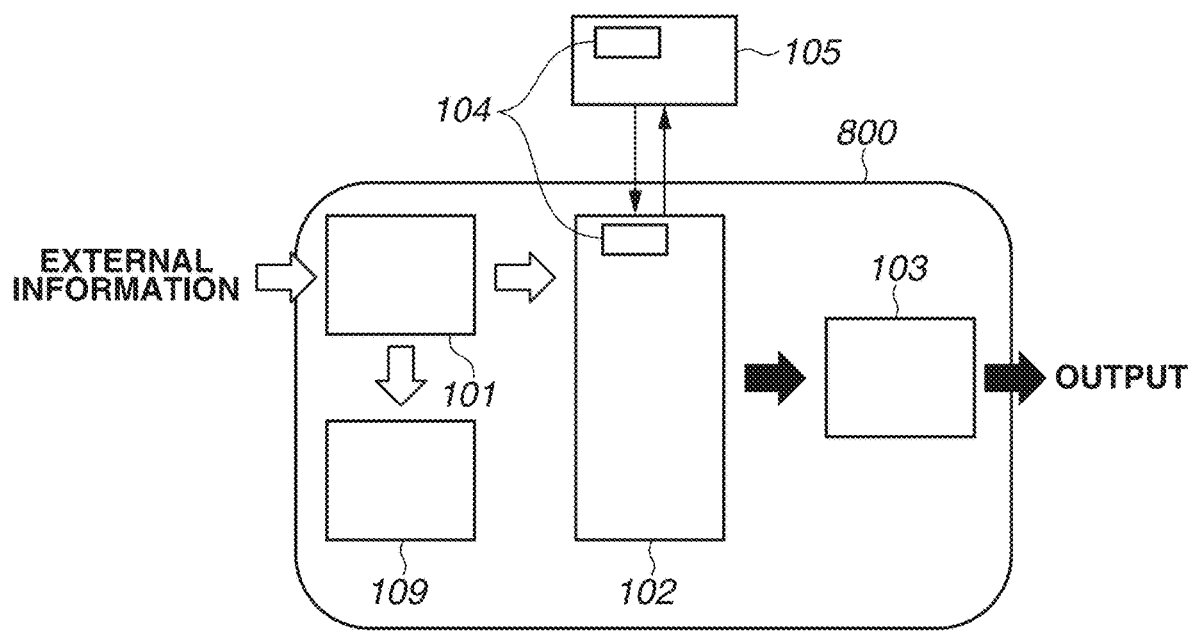
FIG. 12 is a schematic diagram illustrating an imaging display device according to a tenth exemplary embodiment.

Hereinafter, a tenth exemplary embodiment will be described with reference to FIG. 12. FIG. 12 is a schematic diagram illustrating an imaging display device 800 of the present exemplary embodiment. The imaging display device 800 illustrated in FIG. 12 is similar to the imaging display device 130 in FIG. 1C. The same reference numerals are applied to the same elements, and descriptions thereof will be omitted. The imaging display device 800 includes an imaging unit 101, a processing unit 102, a display unit 103, and a processing apparatus 105. The imaging display device 800 further includes a recording unit 109 for recording image information. In the imaging display device 800, each of the processing unit 102 and the processing apparatus 105 includes an AI unit 104. Although the imaging display device 800 includes the recording unit 109 in FIG. 12, the recording unit 109 may be included in the processing unit 102. A position of the recording unit 109 can be set as appropriate. Information to be input to the recording unit 109 is, for example, image information from the imaging unit 101, i.e., information before being converted to prediction image information. By recording the above-described image information, the recording unit 109 can also acquire an image other than a prediction image.

Operation of the imaging display device 800 according to the present exemplary embodiment will be described. The image information from the imaging unit 101 is input to both of the recording unit 109 and the processing unit 102 that generates prediction image information. Operation to be executed after the image information is input to the processing unit 102 is similar to the operation described in the first exemplary embodiment. The image information input to the recording unit 109 is not converted to a prediction image, and directly recorded as the image information acquired by the imaging unit 101. With this configuration, while a temporal difference between the actual phenomenon and a display image is reduced by using the prediction image information generated by the processing unit 102, image information acquired by the imaging unit 101 can be recorded as it is.

Hereinafter, an eleventh exemplary embodiment will be described. In the present exemplary embodiment, a method in which enlargement processing is further executed by the processing unit 102 and the AI unit 104 of the first exemplary embodiment will be described. FIG. 13 is a diagram illustrating the operation of the imaging display device of the present exemplary embodiment. Similar to FIG. 6A, external information in FIG. 13 represents a real image, i.e., image information acquired by the imaging unit 101.

An example 1 is a comparison example. An enlarged image of the example 1 illustrates partial image information acquired by executing enlargement processing on one portion as a specific area of the image information acquired by the imaging unit 101. Herein, the display unit 103 displays an image based on the partial image information. As illustrated in the example 1, generally, resolution of the partial image information is lowered when the enlargement processing is executed thereon.

An example 2 is an example according to the present exemplary embodiment. The enlarged image of the example 1 illustrates partial image information acquired by executing enlargement processing on one portion as a specific area of the image information acquired by the imaging unit 101. Herein, the display unit 103 displays an image based on the partial image information. In the example 2, the processing unit 102 executes enlargement processing on the one portion, and further executes resolution improvement processing thereon. Resolution improvement processing is processing for improving the resolution. For example, the resolution improvement processing can be executed on the partial pixel information by executing inter-pixel complementary processing using a plurality of pieces of image information. Further, resolution improvement processing is executed by complementary processing using a plurality of pieces of image information or complementary processing for estimating a shape by detecting a contour of image information.

In the imaging display device of the present exemplary embodiment, enlargement processing of a part of the image based on the image information can be executed by the processing unit 102 and the AI unit 104. Thus, the image based on the enlarged partial image information can be displayed on the display unit 103. The imaging display device of the present exemplary embodiment can execute resolution improvement processing on the partial image information. Further, the image based on the enlarged partial image information described in the present exemplary embodiment can be realized in concurrence with the function for reducing a temporal difference between the actual phenomenon and the display image as described in the other exemplary embodiments.

Although the exemplary embodiments have been described by taking baseball as an example, the present disclosure is not limited thereto. The imaging display device of the present disclosure can reduce a temporal difference between the actual phenomenon and the display image, so that the user can use a device without having a sense of discomfort. As described above, according to the aspect of the present disclosure, an imaging display device that executes reducing a difference between the actual phenomenon and the display image can be acquired.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-174104, filed Sep. 18, 2018, and No. 2019-126318, filed Jul. 5, 2019, which are hereby incorporated by reference herein in their entirety.

What is claimed is:

1. An imaging display device comprising:
   an imaging unit including a plurality of photoelectric conversion elements;
   a processing unit configured to process a signal transmitted from the imaging unit; and
   a display unit configured to display an image based on the signal transmitted from the processing unit,
   wherein the imaging unit acquires first image information at a first time, the processing unit generates first prediction image information with respect to a second time later than the first time based on the first image information, and the display unit displays an image based on the first prediction image information at the second time, and
   wherein, when a number of images displayed by the display unit per second is expressed as display frame rate (DFR), a temporal difference $\Delta A$ between image information acquired by the imaging unit at a certain time and prediction image information displayed by the display unit at the certain time satisfies a condition $-2/\text{DFR} \leq \Delta A \leq 2/\text{DFR}$.

2. The imaging display device according to claim 1,
   wherein the imaging unit acquires second image information at the second time, and
   wherein, at a third time later than the second time, the imaging unit acquires third image information, and the display unit displays an image based on second prediction image information generated from the second image information and the third image information.

3. The imaging display device according to claim 1,
   wherein the imaging unit executes imaging operation for acquiring fourth image information at a fourth time between the first time and the second time, and
   wherein the first prediction image information is generated from at least the first image information and the fourth image information.

4. The imaging display device according to claim 1, wherein, when a number of pieces of image information acquired by the imaging unit per second is defined as an imaging frame rate, and a number of images displayed by the display unit per second is defined as a display frame rate, the imaging frame rate is equal to or greater than the display frame rate.

5. The imaging display device according to claim 1,
   wherein the processing unit detects a moving object and a still object from the first image information and identifies a first portion detected as the moving object and a second portion detected as the still object, and
   wherein the processing unit executes resolution lowering processing on the second portion when the first prediction image information is generated.

6. The imaging display device according to claim 1, further comprising a line-of-sight detection unit configured to detect a line-of-sight,
   wherein, when the first prediction image information is generated, the processing unit executes processing for lowering resolution of an area other than a line-of-sight area detected by the line-of-sight detection unit.

7. The imaging display device according to claim 6, wherein the processing unit predicts the line-of-sight area with respect to the second time when the first prediction image information is generated.

8. The imaging display device according to claim 1, wherein the temporal difference $\Delta A$ satisfies a condition $-4 \times 10^{-3} \leq \Delta A \leq 4 \times 10^{-3}$.

9. The imaging display device according to claim 1, wherein the processing unit includes an artificial intelligence (AI) unit.

10. The imaging display device according to claim 9, wherein the AI unit has a deep learning function.

11. The imaging display device according to claim 9, wherein the AI unit includes a trained model, and the trained model is established based on data acquired from a specialist.

12. The imaging display device according to claim 1,
    wherein each of the plurality of photoelectric conversion elements can detect light in a visible light area and a near-infrared light area, and
    wherein the processing unit executes processing for converting fifth image information on the near-infrared light area of the fifth image information to image information on the visible light area.

13. The imaging display device according to claim 1,
    wherein the imaging unit includes an imaging area where imaging is executed,
    wherein the display unit includes a display area where display is executed, and
    wherein a centroid of the imaging area and a centroid of the display area coincide each other.

14. The imaging display device according to claim 1, wherein the display unit includes an organic light-emitting diode (LED) or an inorganic LED as a light-emitting element.

15. The imaging display device according to claim 1, wherein the imaging unit includes a back-face illumination type complementary metal oxide semiconductor (CMOS) image sensor.

16. The imaging display device according to claim 1, wherein, in the imaging unit, a substrate on which the plurality of photoelectric conversion elements is arranged and a substrate on which a circuit for processing signals from the plurality of photoelectric conversion elements is arranged are laminated.

17. The imaging display device according to claim 1,
    wherein at least three chips including a first chip on which the imaging unit is arranged, a second chip on which the display unit is arranged, and a third chip on which the processing unit is arranged are laminated, and
    wherein the third chip is arranged between the first chip and the second chip.

18. A wearable device comprising:
    an imaging display device including an imaging unit, wherein the imaging unit includes: a plurality of photoelectric conversion elements, a processing unit configured to process a signal transmitted from the imaging unit, and a display unit configured to display an image based on the signal transmitted from the processing unit;
    a power source unit configured to supply electric power to the imaging display device; and
    an interface configured to wirelessly execute external connection,
    wherein the imaging unit acquires first image information at a first time, the processing unit generates first prediction image information with respect to a second time later than the first time based on the first image information, and the display unit displays an image based on the first prediction image information at the second time, and wherein, when a number of images displayed by the display unit per second is expressed as display frame rate (DFR), a temporal difference $\Delta A$ between image information acquired by the imaging unit at a certain time and prediction image information displayed by the display unit at the certain time satisfies a condition $-2/DFR \leq \Delta A \leq 2/DFR$.

19. An imaging display system comprising:

a plurality of imaging display devices; and a control apparatus configured to control the plurality of imaging display devices, wherein each of the imaging display devices includes an imaging unit having a plurality of photoelectric conversion elements, a processing unit configured to process a signal transmitted from the imaging unit, and a display unit configured to display an image based on the signal transmitted from the processing unit, wherein the imaging unit acquires first image information at a first time, the processing unit generates first prediction image information with respect to a second time later than the first time based on the first image information, and the display unit displays an image based on the first prediction image information at the second time, and wherein, when a number of images displayed by the display unit per second is expressed as display frame rate (DFR), a temporal difference $\Delta A$ between image information acquired by the imaging unit at a certain time and prediction image information displayed by the display unit at the certain time satisfies a condition $-2/DFR \leq \Delta A \leq 2/DFR$.

\* \* \* \* \*